US011644593B2

(12) United States Patent
Gao et al.

(10) Patent No.: US 11,644,593 B2
(45) Date of Patent: May 9, 2023

(54) CALIBRATING TIME-LAPSE SEISMIC IMAGES FOR PRODUCTION OPERATIONS

(71) Applicant: LANDMARK GRAPHICS CORPORATION, Houston, TX (US)

(72) Inventors: Chao Gao, Austin, TX (US); Travis St. George Ramsay, Hockley, TX (US); Felix Segovia, Katy, TX (US)

(73) Assignee: Landmark Graphics Corporation, Houston, TX (US)

(*) Notice: Subject to any disclaimer, the term of this patent is extended or adjusted under 35 U.S.C. 154(b) by 732 days.

(21) Appl. No.: 16/682,981

(22) Filed: Nov. 13, 2019

(65) Prior Publication Data

US 2020/0116895 A1 Apr. 16, 2020

Related U.S. Application Data

(63) Continuation of application No. PCT/US2019/034158, filed on May 28, 2019.

(60) Provisional application No. 62/744,507, filed on Oct. 11, 2018.

(51) Int. Cl.
*G01V 1/30* (2006.01)
*G01V 1/36* (2006.01)

(52) U.S. Cl.
CPC ............ *G01V 1/308* (2013.01); *G01V 1/36* (2013.01); *G01V 2210/512* (2013.01); *G01V 2210/514* (2013.01)

(58) Field of Classification Search
CPC ..... G01V 1/308; G01V 1/36; G01V 2210/514
See application file for complete search history.

(56) References Cited

U.S. PATENT DOCUMENTS

| 6,574,563 B1 * | 6/2003 | Nickel ............... G01V 1/28 702/14 |
| 7,388,808 B2 | 6/2008 | Lee et al. |
| 2005/0038604 A1 * | 2/2005 | Marin ............... G01V 1/30 702/14 |
| 2006/0062083 A1 | 3/2006 | Lee et al. |

(Continued)

FOREIGN PATENT DOCUMENTS

| KR | 20130105792 A | 9/2013 |
| WO | 9859263 A1 | 12/1998 |

OTHER PUBLICATIONS

"Controlled Beam Migration", CGGVeritas, https://www.cgg.com/data/1/rec_docs/1894_CBM.pdf, available at least as early as Jul. 9, 2018, 2 pages.

(Continued)

*Primary Examiner* — Raymond L Nimox
(74) *Attorney, Agent, or Firm* — Kilpatrick Townsend & Stockton LLP

(57) ABSTRACT

A system and method can be used for to calibrating time-lapse seismic volumes by cross-migration rescaling and reorientation for use in determining optimal wellbore placement or production in a subsurface environment. Certain aspects include methods for cross-migration of data sets processed using different migration techniques. Pre-processing of the data sets, optimization of rescaling and reorientation, and identification of adjustment parameters associated with minimum global error can be used to achieve a time-dependent formation data set that addresses error in all input data sets.

20 Claims, 5 Drawing Sheets

(56) References Cited

U.S. PATENT DOCUMENTS

| | | | | |
|---|---|---|---|---|
| 2011/0218737 A1* | 9/2011 | Gulati | ............... | G01V 1/28 |
| | | | | 345/419 |
| 2011/0295510 A1* | 12/2011 | Gulati | ............... | G01V 1/288 |
| | | | | 345/419 |
| 2012/0140593 A1* | 6/2012 | Stoffa | ............... | G01V 1/42 |
| | | | | 367/38 |
| 2014/0257707 A1* | 9/2014 | Chavarria | ......... | G01V 1/345 |
| | | | | 702/16 |
| 2016/0299243 A1* | 10/2016 | Jin | ............... | G01V 1/303 |
| 2017/0276814 A1 | 9/2017 | Zhang | | |

OTHER PUBLICATIONS

"DecisionSpace® Geosciences 10", Halliburton, Data Sheet, 2015, 8 pages.
"SeisSpace® Software", Halliburton, Geologic and Geophysical Technologies, 2017, 5 pages.
FR1909713, "Office Action", dated Oct. 31, 2019, 3 pages.
FR1909713, "Office Action", dated Oct. 31, 2019, 7 pages.
PCT/US2019/034158, "International Search Report and Written Opinion", dated Sep. 20, 2019, 11 pages.
Shao, et al., "Least-Squares Q Migration: The Path to Improved Seismic Resolution and Amplitude Fidelity", SEG Technical Program Expanded Abstracts 2017, Aug. 2017, 5 pages.

\* cited by examiner

CALIBRATING TIME-LAPSE SEISMIC IMAGES FOR PRODUCTION OPERATIONS

CROSS-REFERENCE TO RELATED APPLICATIONS

This application claims priority to International Patent Application No. PCT/US2019/034158 entitled "CALIBRATING TIME-LAPSE SEISMIC IMAGES FOR PRODUCTION OPERATIONS", filed May 28, 2019, which claims the benefit of U.S. Provisional Patent Application No. 62/744,507, entitled "CALIBRATING TIME-LAPSE SEISMIC IMAGES BY CROSS-MIGRATION RESCALING AND REORIENTATION" and filed Oct. 11, 2018, all of which are herein incorporated by reference in their entirety.

TECHNICAL FIELD

The present disclosure relates generally to wellbore and production operations or planning for wellbore and production operations as a part of reservoir management. More particularly, without limitation, the disclosure relates to calibrating time-lapse seismic volumes by cross-migration rescaling and reorientation for use in determining optimal wellbore placement in the subsurface environment.

BACKGROUND

Seismic imaging is a technology used to characterize subsurface geology and identify dense non-aqueous phase liquids such as gas, oil, and other hydrocarbon fluids. Seismic imaging technology techniques direct an intense sound source into the ground to evaluate subsurface geology. Geophones, analogous to microphones, receive signals as echoes that travel back through the ground, and record the intensity and time of the echoes. Two types of seismic images can be produced from the sound waves. Reflected waves travel downward, bounce off a layer or object in the soil or rock, and return to the surface. Refracted waves travel downward, then turn at a geologic boundary and travel along it before returning back to the surface. Various image analysis applications can turn these received signals into images of the geologic structure. The received and analyzed signals provide a three-dimensional digital model of the subsurface geology of a region. This information can be used to identify preferential flow paths, determine the placement and screening of wells, and help select a remediation technology.

DETAILED DESCRIPTION

Figure 1:
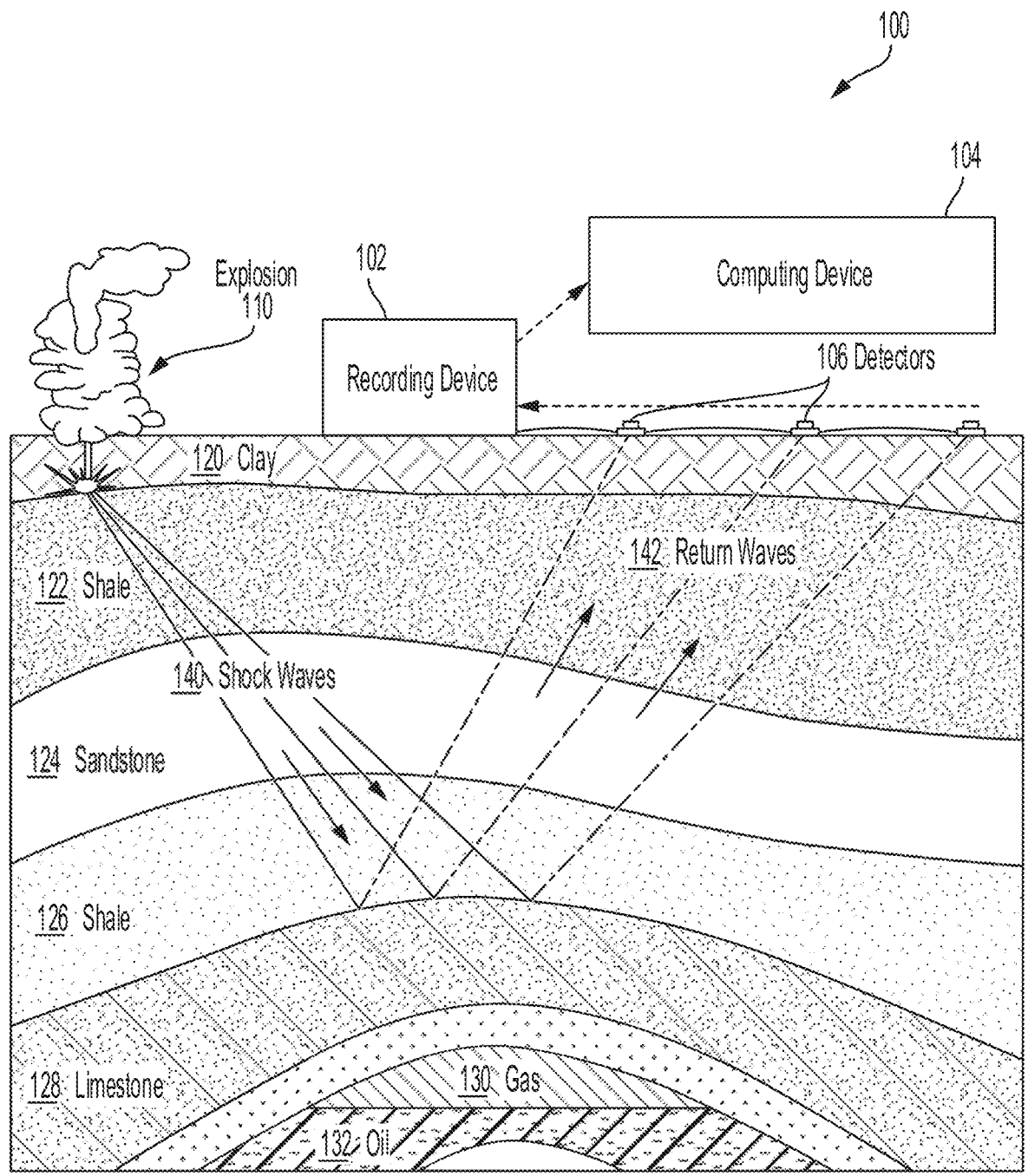
FIG. 1 is a cross-sectional illustration of subsurface environment geology showing time-dependent formation data collection according to one aspect of the present disclosure.

Certain aspects and features relate to calibrating time-lapse seismic volumes by cross-migration rescaling and reorientation for use in determining optimal wellbore placement in a subsurface environment. Seismic images and models can be created using multiple time-dependent formation data points gathered by sensing tools. The models can be represented as three-dimensional models that can be used to determine the location of non-aqueous fluids and gases within a subterranean formation. In some examples, the three-dimensional models can include time-lapse seismic volumes, such that changes in the models can be observed between different instances of time. Cross-migration can be the process of transitioning or reconstructing seismic models developed by one type of data sequencing process to be in a format of a different type of seismic sequencing process. Transitioning models between formats resulting from different data sequencing processes can involve rescaling and reorienting the three-dimensional models. For example, a three-dimensional model can be rescaled by a scalar parameter, reoriented by planar translation of the time-lapsed volumes, tilted or by angular rotation of the time-lapsed volumes with respect to a three-dimensional axis. By transitioning a seismic model from one processing format orientation to another, a transitioned seismic model can be compared against similar seismic models of the same processing format to increase the confidence of the time-dependent formation data for use in optimizing production and identifying bypass pay locations then subsequently planning well and completion processes.

Certain aspects provide processes for cross-migration of images based on time-dependent formation data. Such data can include, but is not limited to, seismic data, log data, wellbore analysis data and any time-dependent data set representative of a subsurface geology. To provide a clear and concise description of the various aspects, time-dependent formation is described herein with reference to seismic data. However, other forms of time-dependent formation data can also be used with the aspects processes for calibrating time-lapse seismic images.

Post stack time migration ("PSTM") and post stack depth migration ("PSDM") can be used to process seismic data. Due to different procedures of conducting the migration processes, the results generated from these two methods can cause mismatch of the resulting three-dimensional grids once the resulting seismic is blocked to the three-dimensional geocellular grid or oriented in a vector cloud space. The differences between seismic processing parameters (source, inline/crossline orientation, and spacing) for surveys at different times and the differences between seismic processing sequences pose challenges for data comparison. If different stages of seismic data are obtained from different methods, the interactions between PSTM and PSDM can be difficult to analyze.

Cross-migration rescaling, tilting, rotation, translation, and reorientation can be used to reconstruct the 3D grids or volumes from one seismic processing method to another to make the grids comparable in 30 space and coincident with time-dependent anomalies. Cross-migration rescaling, tilting, translating, and reorientation can be used in a number of applications. For example, cross-migration rescaling and reorientation can be used in a high-fidelity seismic simulation 4D workflow. Such a workflow can incorporate seismic (acquisition, processing, inversion), petrophysics, rock physics, earth modeling, and solid mechanics/fluid flow simulation. If different processing sequences are used for seismic data in different vintages, cross-migration resealing and reorientation can make the vintages directly comparable in the same spatial frame of reference. By allowing for comparison of the seismic data collected at different times, identification of bypassed pay locations can be determined. Bypassed pay locations can be further confirmed in the simulation model. Based on the location of a bypassed pay location as determined by the comparison of the vintages derived from cross-migration rescaling and reorientation, new well placement, production optimization, completion(s), or reevaluations of waterflood strategy can be provided.

Current comparison of seismic data in different vintages or a single vintage is limited to all seismic volumes or grid data that is devised following a single processing method. If there are multiple vintages of seismic with one processing method, and a vintage of seismic processed by a different method than the first, comparison between or execution of integrated 4D workflows may not be performed when the processing method differs between seismic volumes. Time-lapse seismic surveys are expensive to conduct and process. Thus, unless re-processing occurs for seismic data with non-compliant processing compared to other vintages, an operator stands to lose substantial amounts of time and value from the seismic data that was not processed in compliance with other surveys. Re-processing of the seismic data may provide a more complete analysis of the seismic data for vintage comparison purposes, but requires additional time and resources.

Cross-migration rescaling and reorientation can provide for building connections between time independent or dependent PSTM and PSDM, which can allow for comparison and analysis of the data in both PSTM and PSDM if these methods were used interchangeably in error for the execution of an integrated 4D workflow. Cross-migration rescaling and reorientation can also be extended to reconstruct 3D grids and seismic volumes in different seismic acquisition surveys. This approach can maximize the use of the collected seismic data. Some embodiments can provide for methods to compare seismic data, particularly of different vintages and migration schemes. Embodiments can enable the recovery of seismic data in similitude to other types of seismic imaging outputs as opposed to reprocessing seismic data at higher costs and length of time.

For example, an integrated time-lapse seismic-to-reservoir simulation may include processing three seismic vintages, two of which had the same processing sequences that differed from the third vintage. While the third image can be reprocessed to better compare to the first two vintages, this process can be time consuming. As a result, the third vintage is often ignored and decision-making processes are performed based on the first two vintages. Cross-migration rescaling and reorientation can leverage the existing multi-vintage data to allow for comparative use of the third and any additional vintages to provide a more complete picture of the seismic data while removing the time for re-processing one or multiple available seismic vintages. Cross-migration rescaling and reorientation can compare multiple vintages in a common framework when disparate processing sequences were initially used to develop the vintages.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

FIG. 1 is a cross-sectional side view of an example of subsurface environment geology showing seismic data collection according to some aspects. The environment 100 includes a subsurface system having a number of discrete layers including soil and substrate layers 120-128 and oil 132 and gas 130 layers. A wave generation mechanism such as an explosion 110 or wave generation device may be used at the surface of the environment 100 to generate waves capable of traveling through some of the substrate layers 120-128. Detectors 106 can detect reflected and refracted waves such as return waves 142 and provide this information to a recording device 102. In certain aspects, the recording device 102 can forward gathered seismic data to a computing device 104. In other aspects, the recording device 102 may be the computing device 104 such as an edge device located within the environment 100.

One or more wave generation mechanisms may generate vibrations, compression waves, or shock waves that travel through the subsurface. Waves are generated directly on the surface of the environment 100 and oriented downward into the subsurface in order to mitigate the impact of atmospheric effects on wave propagation. For this reason, wave generation techniques and devices that leverage direct contact with the surface of the environment 100 are desirable. In certain aspects, techniques involving the generation of shock waves, such as a controlled explosion 110 or vibroseis machine can be used to generate waves 140. Devices capable of generating vibration or compression waves can be used to generate waves 140. For example, in some aspects, recording device 102 can be a large vehicle capable of vibrating the surface of the environment 100 to generate waves 140. Waves 140 can be reflected or refracted off various subsurface layers such as substrate layers 120-128 and received by detectors 106 at the surface.

A group of detectors 106 is distributed along the surface of the environment 100 to detect movement or vibration within the subsurface such as return waves 142. The detectors 106 can be placed on the surface or inserted into the uppermost layer, i.e., clay 120. The detectors 106 can be geophones or superphones, devices configured to detect movement within the subsurface and convert that movement into voltage readings. Each of the detectors 106 communicates voltage readings based on received return waves 142 to the recording device 102. Voltage readings can be communicated wirelessly or via wired communications protocols according to various implementations.

The recording device 102 receives voltage readings from the group of detectors 106 deployed throughout the surface of the environment 100. These voltage readings can be compared to a baseline or expected voltage. A difference between the received voltage reading and the expected voltage is a seismic response. The recording device 102 communicates seismic responses as seismic data to a computing device 104, which may aggregate and analyze the seismic data. In some aspects, the recording device 102 can include the computing device 104 and can perform analysis and modification of the seismic response while in the environment 100.

The computing device 104 collects the received data. In some aspects, the seismic data collected by the computing device 104 can be common midpoint (CMP) stacked data, Images generated from the CMP data sets may be skewed in time or depth. To correct these problems, the computing device 104 can perform PSTM and PSDM on the CMP data set in order to correct location calculations for subsurface elements. However, these two techniques, PSTM and PSDM may produce 3D image results having some variation there between. Cross-migration rescaling and reorientation can be performed by the computing device 104 to reduce variation between results of PSTM and PSDM processing.

Figure 2:
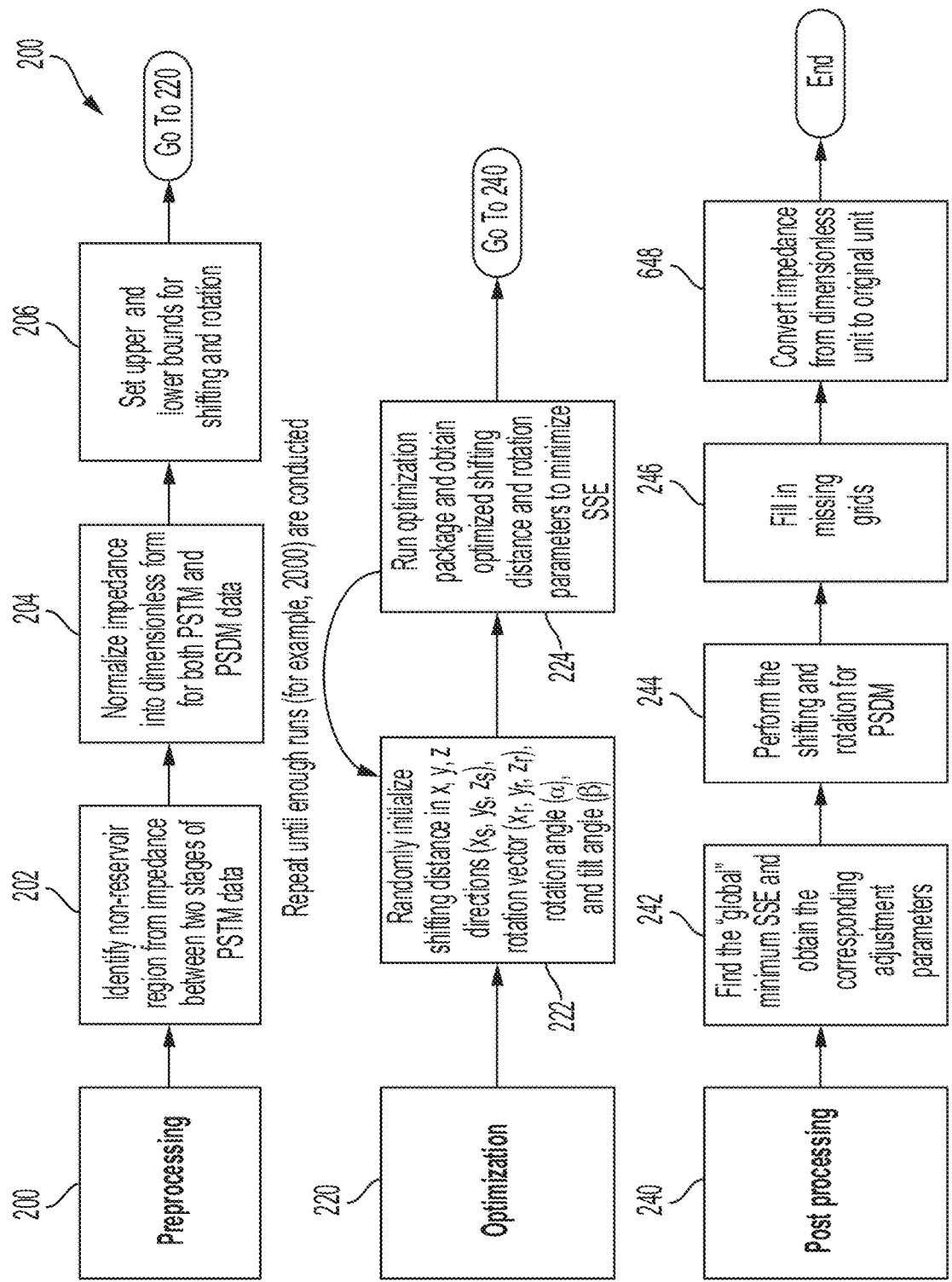
FIG. 2 is an example of a process for performing preprocessing, optimization, and post-processing for calibrating time-lapse seismic images by cross-migration according to one aspect of the present disclosure.

FIG. 2 depicts an example processes for performing preprocessing 200, optimization 220, and post-processing 240 for calibrating time-lapse seismic images by cross-migration according to various aspects. As shown in FIG. 2, cross-migration rescaling and reorientation can be divided into three stages: preprocessing 200, optimization 220, and post-processing 240. Processes 200, 220, and 240 can be carried out by computing device 104, recording device 102 in combination with computing device 104, or an edge device that is both recording device 102 and computing device 104.

During preprocessing 200, computing device 104 can, in block 202, non-reservoir regions of the subsurface can be identified from impedance differences between two vintages of PSTM data, Impedance data correlates to a hardness of a subsurface geological element. Changes in impedance from one stage of PSTM to the next can indicate a change in hardness and thus imply a variation of density in the saturated geological element. Oil 132 and gas 130 layers can exhibit changes in measured impedance between stages PSTM, resulting in their categorization as potential reservoir regions. Conversely, geological elements exhibiting consistent impedance values across multi-vintage PSTM stages belong to non-reservoir regions.

The impedance data, including that of both PSTM and PSDM data, can then be normalized in block 204, into dimensionless data sets. Normalization can be performed in a variety of ways. For example, on method of normalization can be performed using Eq. (1).

$$x_{dimensionless} = \frac{x - \min(x)}{\max(x) - \min(x)} \qquad \text{Eq. 1}$$

In Eq. 1, x is the original impedance, and $x_{dimensionless}$ is a corresponding dimensionless value. Max(x) and min(x) represent the maximum and minimum impedance values. They can be maximum and minimum values from all surveys or from each survey. In the provided examples, the maximum and minimum are derived from the respective seismic survey vintages. The final step for preprocessing, in block 206, is setting the upper and lower bounds for shifting and rotation. In some aspects, the lower and upper bounds may be associated with the edges of a surveyed subsurface environment or an offset thereof. Preprocessing then ends and the method proceeds to the optimization 220.

Using rescaling and reorientation, 3D grids can be rotated any number of degrees about any 3D vector and then the grids can be translated as necessary in the 3D space domain. Various aspects mare described with reference to Cartesian coordinate systems, however alternate coordinate systems such as polar and spherical can be used to represent the shift distance, rotation vector, and angle of rotation described herein. In block 222, a shifting distance in x, y, z directions $(x_s, y_s, z_s)$, rotation vector $(x_r, y_r, z_r)$, tilt angle ($\beta$) and rotation angle ($\alpha$) are randomly initialized. In block 224, optimization 220 can continue until the computing device 104 identifies the optimal shifting distance and rotation or translation parameters for one processing method to minimize the sum of squared errors ("SSE").

For each iteration in optimization 220, the grids can be rotated a degrees about a 3D vector $(x_r, y_r, z_r)$, and then shifted for $(x_s, y_s, z_s)$. After rotation, tilting, resealing, or translation, the error can be calculated, which can be defined as the impedance difference between a first resealed processing method and the seismic processed by a different processing method in the non-reservoir region. There can be a small amount of change of impedance in the non-reservoir region represented as time-shifts or response in changes to stress because production and injection operations are conducted nearby in reservoir regions. Non-reservoir regions can be used for calculating SSE. Some examples can detect if the minimum SSE is reached. If not reached, a system can update the parameters ($\alpha$, $x_r$, $y_r$, $z_r$, $x_s$, $y_s$, $z_s$) and go to the next iteration until the minimum SSE is obtained. Random initializations such as those in block 222, can be used during each iteration of optimization sequences to prevent the optimization from reaching a local minimum instead of a global minimum. The optimization 220 can be repeated until enough runs are performed. The computing device can then proceed to post-processing 240.

During post-processing 240, computing device 104 can in block 242 identify global minimum SSE among random initialization optimization runs, Each local minimum SSE corresponds to a set of adjustment parameters including rotation and shifting parameters ($\alpha$, $\beta$, $x_r$, $y_r$, $z_r$, $x_s$, $y_s$, $z_s$). When the "global" minimum SSE is identified, in block 244, the corresponding parameters ($\alpha$, $\beta$, $x_r$, $y_r$, $z_r$, $x_s$, $y_s$, $z_s$) can be used to perform the shifting and rotation of the 3D grids for the seismic data that is the focus of the manipulation. In some examples, the spatial re-positioning of the seismic data can result in empty grids, or instances where a majority of the grids are missing. Layers that have a large number of missing grids (e.g., cells) can be discarded or characterized by an assumed value. In block 246, for the remaining layers, missing grids can be "filled in" through linear extrapolation or "next fill" methods. For example, time-lapse (4D) seismic samples cab depict the results obtained by using the cross-migration method. After cross-migration rescaling and reorientation, the impedance values of a first seismic volume (PSDM) in the non-reservoir region can match the impedance values of a second seismic volume (PSTM) more closely than the impedance values of the original seismic volume (PSDM). After cross-migration is performed, in block 248, the impedance from the dimensionless values can be converted to the original units.

In some examples, cross-migration rescaling can be performed using cross-correlation, which is a measure of similarity between two matrices as a function of the displacement of one relative to the other. Cross-correlation can involve the use of a moving window to identify key features from one survey that should exist in another. Those seismic surveys can be processed by different methods. In some examples, seismic volumes can be used to depict cross-migration using cross-correlation, where a first seismic volume is the result of PSTM and a second seismic volume is the result of PSDM. In the first seismic volume, a 3D sub-domain can be created for use as a template, which can include a feature to be detected. The template can serve as a moving window and can search for the same domain in S3. For each location, the element-by-element products for the overlapping regions can be computed, and the summation of those products is one component of the cross-correlation matrix. Once the search for the domain in second seismic volume is finished, the maximum component of the cross-correlation matrix and the location (e.g., index) of the maximum component can be identified, which can identify the corresponding matching region in the second seismic volume.

In some examples, the window size can be varied and multiple cross-correlation runs can be performed to determine if the identified region in the second seismic volume varies with window size. This cross-correlation method can be used to determine the maximum signals. For minimum signals, the signal can be reversed (reversed signal=1−original signal) for both the first seismic volume and the second seismic volume before running the cross-correlation.

Figure 3:
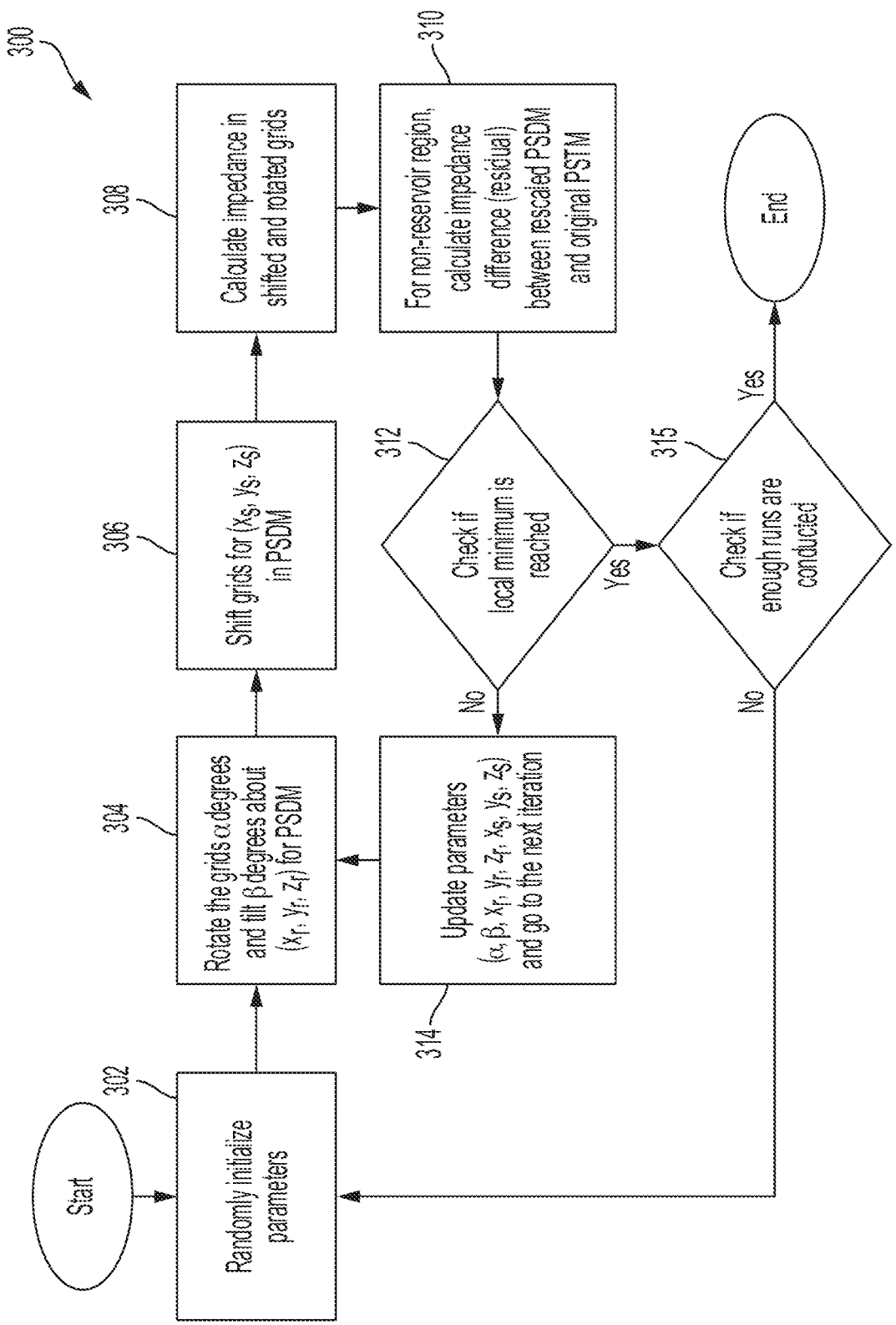
FIG. 3 is an example of a flow diagram for performing the optimization process for calibrating time-lapse seismic images by cross-migration according to one aspect of the present disclosure.

FIG. 3 depicts an example of a flow diagram for performing the optimization process for calibrating time-lapse seismic images by cross-migration, as described above. The flow diagram of FIG. 3 depicts the process for calibrating time-lapse seismic images by cross-migration using PSDM. In some examples, computing device 104 can perform the processes described in FIG. 3 using PSDM or PSTM. For example, either the PSDM grids can be cross-migrated to converge with the PSTM grids as described in method 300, or the PSTM girds can be cross-migrated to converge with the PSDM grids using the same operations.

The method 300 is a process identifying the best fit shift distance, rotation vector, tilt and rotation angle parameters during cross-migration of PSTM and PSDM seismic data. Several iterations of the method 300, in whole or in part, can be performed until the optimal or best fit parameters are identified. In block 302, the computing device 104, can randomly initialize the shifting distance in x, y, z directions ($x_s$, $y_s$, $z_s$), rotation vector ($x_r$, $y_r$, $z_r$), rotation angle ($\alpha$) and tilt angle ($\beta$). These parameters may be randomly initialized within the upper and lower bounds established during pre-processing (e.g., block 206 of FIG. 2).

In block 304, the computing device 104, can rotate all PSDM-based grids a degrees, or tilt them by $\beta$ degrees, about the rotation vector ($x_r$, $y_r$, $z_r$). The depth-based migration data set is thus rotated using the randomly initialized values for rotation vector and angle. In block 306, the computing device 104 can shift the PSDM grids based on the shift distance directions ($x_s$, $y_s$, $z_s$). In some aspects, operations of blocks 304 and 306 may occur in parallel or may be reversed. In block 308, the computing device 104, can calculate the impedance in the shifted and rotated grids.

In block 310, the computing device 104, calculate the difference in impedance for one or more non-reservoir regions, between the rotated and shifted PSDM grids and the PSTM grids. The difference in impedance between the rescaled PSDM grids and the PSTM grids is the error in cross-migration. In block 312, the computing device 104, can determine whether the minimum SSE has been reached. If the difference in impedance is greater than the minimum SSE, then the minimum SSE has not been reached.

In response to determining that the minimum SSE has not been reached (i.e., block 312="No"), the computing device 104 can in block 314, update the parameters rotation angle $\alpha$, tilt angle $\beta$, rotation vector ($x_r$, $y_r$, $z_r$), shift distance ($x_s$, $y_s$, $z_s$) and go to the next iteration of the method 300. The parameters can be adjusted by incremental values of a fixed step size during each iteration. In some examples, the SSE may reach a local minimum before reaching a global minimum resulting in reducing shifting, rotation capabilities, but without reaching the global minimum. In such examples, the parameters can be randomly reinitialized to prevent stalling of the optimization process. Once the parameters have been adjusted, the computing device 104 can return to block 304 and proceed with another iteration of method 300.

In response to determining that the minimum SSE has been reached (i.e., block 312="Yes"), the computing device 104 can in block 316, determine whether the number of iterations performed thus far meets or exceeds a threshold. The threshold can be a large number of iterations such as 2000 to ensure convergence of results and parameter stability. The computing device 104 can maintain an iteration counter that is modified at each iteration of the method 300 to track the number of iterations completed.

If the threshold number of iterations has not been reached (i.e., block 316="No") then the computing device 104, can return to block 302 and randomly reinitialize the parameters. If the threshold number of iterations has been reached (i.e., block 316="Yes") then the computing device 104, may end the optimization process and proceed to post-processing 240 in FIG. 2.

Figure 4:
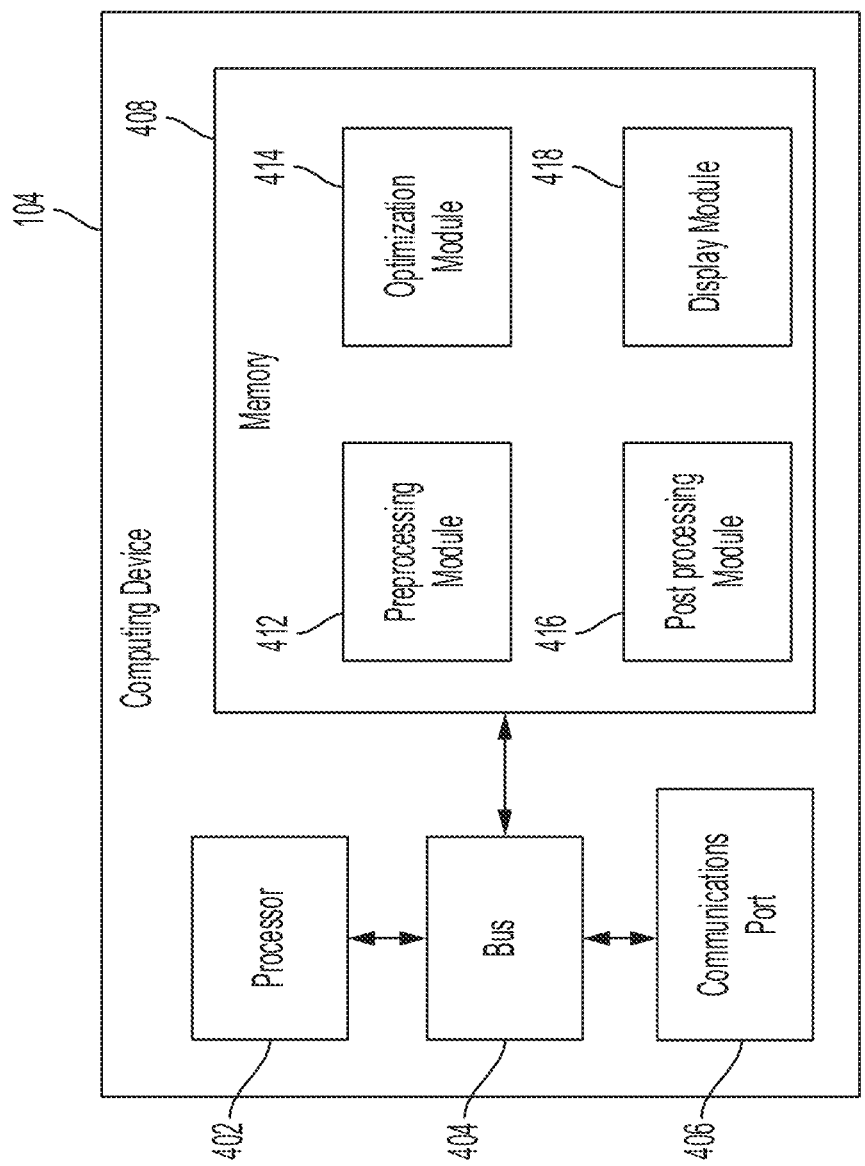
FIG. 4 is a block diagram of a computing device usable for executing program code for calibrating time-lapse seismic images by cross-migration rescaling and reorientation according to one aspect of the present disclosure.

FIG. 4 is a block diagram of a computing device 400 usable for executing program code for calibrating time-lapse seismic images by cross-migration rescaling and reorientation according to one example.

The computing device 400 can include a processor 402, a bus 404, a communications port 406, and a memory 408. In some examples, the components shown in FIG. 4 (e.g., the processor 402, the bus 404, the communications port 406, and the memory 408) can be integrated into a single structure. For example, the components can be within a single housing. In other examples, the components shown in FIG. 4 can be distributed (e.g., in separate housings) and in electrical communication with each other.

The processor 402 can execute one or more operations for implementing some examples. The processor 402 can execute instructions stored in the memory 408 to perform the operations. The processor 402 can include one processing device or multiple processing devices. Non-limiting examples of the processor 402 include a Field-Programmable Gate Array ("FPGA"), an application-specific integrated circuit ("ASIC"), a microprocessor, etc.

The processor 402 can be communicatively coupled to the memory 408 via the bus 404. The memory 408 may include any type of non-volatile memory device that retains stored information when powered off. Non-limiting examples of the memory 408 include electrically erasable and programmable read-only memory ("EEPROM"), flash memory, or any other type of non-volatile memory. In some examples, at least some of the memory 408 can include a medium from which the processor 402 can read instructions. A computer-readable medium can include electronic, optical, magnetic, or other storage devices capable of providing the processor 402 with computer-readable instructions or other program code. Non-limiting examples of a computer-readable medium include (but are not limited to) magnetic disk(s), memory chip(s), ROM, random-access memory ("RAM"), an ASIC, a configured processor, optical storage, or any other medium from which a computer processor can read instructions. The instructions can include processor-specific instructions generated by a compiler or an interpreter from code written in any suitable computer-programming language, including, for example, C, C++, C#, etc.

The communications port 406 can be used to communicate with the external systems or devices, such as a database including seismic data useable for implementing various examples. Seismic data received by the communications port 406 can be transmitted to the memory 408 via the bus 404. The memory 408 can store any received seismic data and any data relating to the seismic data for implementing some examples. The memory 408 can store characteristics of the seismic data and any manipulations of the seismic data.

The memory 408 can include program code for a preprocessing module 412, an optimization module 414, a post-processing module 416, and a display module 418. The preprocessing module 412 can be used to implement preprocessing processes as described in examples. The optimization module 414 can be used to implement optimization processes as described in examples. The post-processing module 416 can be used to implement post-processing processes as described in examples. The display module 418 can be used to display the seismic data and any corresponding data in a visual format (e.g., dimensionless format, three-dimensional format, etc.).

Figure 5:
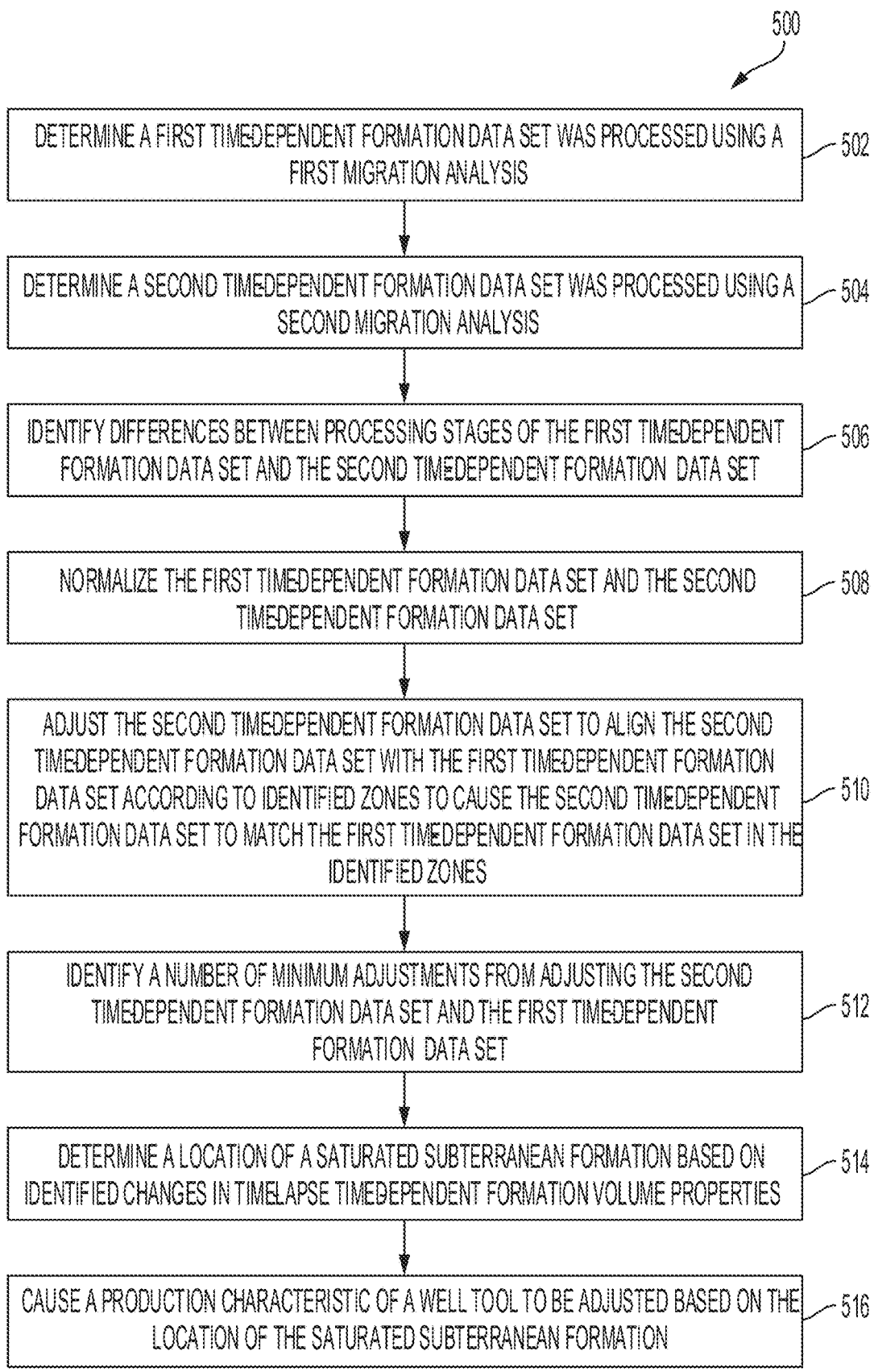
FIG. 5 is a flowchart describing a process for calibrating time-lapse seismic images by cross-migration rescaling and reorientation according to one aspect of the present disclosure.

FIG. 5 is a flowchart describing a process for calibrating time-lapse seismic images by cross-migration rescaling and reorientation according to one aspect of the disclosure. Certain aspects of method 500 can be performed by computing device 104, computing device 104 and recording device 102 in combination, or an edge device including both recording device 102 and computing device 104. Modules 412-418 stored in memory 408 in combination with processor 402 of computing device 104 can perform operations of method 500.

In block 502, a first time-dependent formation data set is determined to have been processed using a first migration analysis. For example, using preprocessing module 412, processor 402 can determine that a time-dependent formation data set can include multiple time-lapsed images of a measured subterranean formation, where the images can be processed using PSTM. In block 504, a second time-dependent formation data set is determined to have been processed using a second migration analysis. For example, using preprocessing module 412, processor 402 can determine that a second time-dependent formation data set can include multiple time-lapsed images of the same subterranean formation represented by the first seismic data set, where the images for the second seismic data set can be processed using PSDM. The operations of blocks 502 and 504 may be reversed, or may occur in parallel according to certain aspects.

In block 506, differences between processing stages of the first time-dependent formation data set can be identified. For example, using preprocessing module 412, the processor 402 can identify variations in impedance between processing stages during a PSTM of seismic data. Impedance variations can be used to identify non-reservoir regions of the subsurface environment. These non-reservoir regions are used in further cross-migration processing.

In block 508, the first time-dependent formation data set and the second time-dependent formation data set can be normalized. For example, using preprocessing module 412, the processor 402 can execute one or more mathematical functions to remove the component of dimension from elements of each time-dependent formation data set. A variety of techniques exist for data normalization that include dimension stripping. Equation 1, disclosed with reference to FIG. 2 provides an exemplary function for removing the dimension component from each element of the time-dependent formation data sets. Proper normalization can reduce error during the cross-migration process by ensuring that all elements of the data sets are unit neutral.

Blocks 502 through 508 can be performed as part of the preprocessing portion for calibrating time-lapse seismic images by cross-migration. For example, preprocessing module 412 can be used by processor 402 to perform steps 502-508 as part of preprocessing 200.

In block 510, the second time-dependent formation data set can be adjusted to cause the second time-dependent formation data set to match the first seismic data set. In some examples, the processor 402 can use the optimization module 414 to adjust the second time-dependent formation data set by rescaling, reorienting, tilting, rotating resizing, shifting, or otherwise manipulating the data sets within three-dimensional space. In some examples, adjusting the first time-dependent formation data set and second time-dependent formation data set can be performed with respect to time (e.g., adjusting time-lapsed images). The second time-dependent formation data set can be adjusted to match the first time-dependent formation data set such that target zones have strong correlation. This process can be performed as part of the optimization 220 portion for calibrating time-lapse seismic images by cross-migration.

In block 512, a number of minimum adjustments can be identified after adjusting the first time-dependent formation data set and the second time-dependent formation data set. For example, using post-processing module 416, the processor 402 can identify a global minimum SEE and then calculate corresponding shift distance, rotation vector, and rotation angle parameters. The global minimum SSE and the shift distance, rotation vector, and rotation angle parameters can be determined during the post-processing 240 stage for calibrating time-lapse seismic images by cross-migration.

In block 514, a location of a saturated subterranean rock formation can be determined based on the number of minimum adjustments. For example, using post-processing module 416, the processor 402 can reorient a model representing time-dependent formation data based on the number of minimum adjustments (e.g., minimum SSE). The adjustments can include some or all of shifting the model in a direction based on the shift distance, rotating the model about the rotation vector according to the rotation angle. The adjusted model based on the minimum SSE can be used to increase the number of reliable data points to more accurately predict the location of a fluid within a subterranean formation. That is, the adjusted model can be used to reliably identify reservoir regions within the subsurface environment, because the PSDM and PSTM data sets have been cross-migrated to align.

In block 516, an operating or production characteristic of a well is caused to be adjusted or planned based on the location of the subterranean rock formation. Once the spatiotemporal anomaly associated with a subterranean rock formation is confirmed, an operating characteristic of a well can be adjusted depending on the phase of the well system planning or completion or a new well may be planned. There may exist a variety of well tools with various operating characteristics for use in planning and completion phases of a well system. As another example, a well may be a measuring-while drilling ("MWD") or logging-while-drilling ("LWD") device or a wireline tool (e.g., downhole sensor) that can be used to measure conditions within and surrounding the wellbore. For example, a downhole sensing tool or device may have operational characteristics such as trajectory that may be adjusted a priori as a part of the well planning phase based on the location of the subterranean rock formation as determined from the calibration of time-lapse seismic images via integrated time-lapse seismic analysis leveraging cross-migration rescaling and reorientation when disparities in multi-vintage seismic data volumes exist.

In some aspects, systems, devices, and methods for managing production from a subsurface reservoir are provided according to one or more of the following examples:

As used below, any reference to a series of examples is to be understood as a reference to each of those examples disjunctively (e.g., "Examples 1-4" is to be understood as "Examples 1, 2, 3, or 4").

Example 1: A computing device including a processor; and a non-transitory memory device comprising instructions that are executable by the computing device to cause the processor of the computing device to perform operations comprising: identifying similarities between processing stages of a first time-dependent formation data set processed using a first migration analysis and a second time-dependent formation data set processed using a second migration analysis; normalizing the first time-dependent formation data set and the second time-dependent formation data set; adjusting the second time-dependent formation data set to align the second time-dependent formation data set with the first time-dependent formation data set according to identified zones to cause the second time-dependent formation data set to spatially match, by some tolerance, the first time-dependent formation data set in the identified zones; identifying a number of minimum adjustments from adjusting the second time-dependent formation data set and the first time-dependent formation data set; determining a location of a saturated subterranean formation of interest based on identified minimum adjustments; and causing a production characteristic of a well to be adjusted based on the location of the saturated subterranean formation.

Example 2: the computing device of any of example 1, wherein the first migration analysis is derived from post stack time or depth migration and the second migration analysis is derived from post stack migration of an alternate processing methodology.

Example 3: the computing device of examples 1 or 2, wherein normalizing the first time-dependent formation data set and the second time-dependent formation data set comprises executing a function on the first time-dependent formation data set and the second time-dependent formation data set to remove dimension components.

Example 4: the computing device of any of examples 1-3, wherein adjusting the second time-dependent formation data set comprises: initializing adjustment parameters; and modifying the second time-dependent formation data set by one or more of rotating, rescaling, tilting, or translating the second time-dependent formation data set according to the first time-dependent formation data set and the adjustment parameters.

Example 5: the computing device of example 4, wherein the operations further comprise: calculating an impedance difference between the modified second time-dependent formation data and the first time-dependent formation data set; determining, based on the impedance difference, whether a local minimum impedance is reached; and modifying the adjustment parameters in response to determining that a local minimum impedance has not been reached.

Example 6: the computing device of any of examples 4 or 5, wherein the adjustment parameters are one or more of a shift distance, a rotation vector, angle of tilt, scaling factor or a rotation angle.

Example 7: the computing device of any of examples 1-6, wherein identifying the number of minimum adjustments comprises: identifying a global minimum error; determining the minimum adjustments based on the global minimum error; modifying the adjusted second time-dependent formation data set by one or more of rotating, rescaling, tilting, or translating the second time-dependent formation data set according to the first time-dependent formation data set and the minimum adjustments; converting a result of modifying the adjusted second time-dependent formation data to original dimensions; and wherein determining the location of the saturated subterranean formation of interest based on identified minimum adjustments includes determining the location based on the converted result of modifying the adjusted second time-dependent formation data.

Example 8: the computing device of any of examples 1-8, wherein causing a production characteristic of a well to be adjusted includes modifying a production plan to increase productivity.

Example 9: a computer-implemented method comprising: identifying similarities between processing stages of a first time-dependent formation data set processed using a first migration analysis and a second time-dependent formation data set processed using a second migration analysis; normalizing the first time-dependent formation data set and the second time-dependent formation data set; adjusting the second time-dependent formation data set to align the second time-dependent formation data set with the first time-dependent formation data set according to identified zones to cause the second time-dependent formation data set to match the first time-dependent formation data set in the identified zones; identifying a number of minimum adjustments from adjusting the second time-dependent formation data set and the first time-dependent formation data set; determining a location of a saturated subterranean formation of interest based on identified minimum adjustments; and causing a production characteristic of a well to be adjusted based on the location of the saturated subterranean formation.

Example 10: the computer-implemented method of example 9, wherein first migration analysis is derived from post stack time or depth migration and the second migration analysis is derived from post stack migration of an alternate processing methodology.

Example 11: the computer-implemented method of any of examples 9 or 10, wherein normalizing the first time-dependent formation data set and the second time-dependent formation data set comprises executing a function on the first time-dependent formation data set and the second time-dependent formation data set to remove dimension components.

Example 12: the computer-implemented method of any of examples 9-11, wherein adjusting the second time-dependent formation data set comprises: initializing adjustment parameters; and modifying the second time-dependent formation data set by one or more of rotating, rescaling, tilting, or translating the second time-dependent formation data set according to the first time-dependent formation data set and the adjustment parameters.

Example 13: the computer-implemented method of example 12, further comprising: calculating an impedance difference between the modified second time-dependent formation data and the first time-dependent formation data set; determining, based on the impedance difference, whether a local minimum impedance is reached; and modifying the adjustment parameters in response to determining that a local minimum impedance has not been reached.

Example 14: the computer-implemented method of any of examples 12 and 13, wherein the adjustment parameters are one or more of a shift distance, a rotation vector, angle of tilt, scaling factor or a rotation angle.

Example 15: the computer-implemented method of any of claims 9-14, wherein identifying the number of minimum adjustments comprises: identifying a global minimum error; determining the minimum adjustments based on the global minimum error; modifying the adjusted second time-dependent formation data set by one or more of rotating, rescaling, tilting, or translating the second time-dependent formation data set according to the first time-dependent formation data set and the minimum adjustment parameters; converting a result of modifying the adjusted second time-dependent formation data to original dimensions; and wherein determining the location of the saturated subterranean formation of interest based on identified minimum adjustments includes determining the location based on the converted result of modifying the adjusted second time-dependent formation data.

Example 16: the computer-implemented method of any of examples 9-15, wherein causing a production characteristic of a well to be adjusted includes modifying a production plan to increase productivity.

Example 17: a non-transitory computer-readable medium that includes instructions that are executable by a processing device for causing the processing device to perform operations comprising: identifying similarities between processing stages of a first time-dependent formation data set processed using a first migration analysis and a second time-dependent formation data set processed using a second migration analysis; normalizing the first time-dependent formation data set and the second time-dependent formation data set; adjusting the second time-dependent formation data set to align the second time-dependent formation data set with the first time-dependent formation data set according to identified zones to cause the second time-dependent formation data set to match the first time-dependent formation data set in the identified zones; identifying a number of minimum adjustments from adjusting the second time-dependent formation data set and the first time-dependent formation data set; determining a location of a saturated subterranean formation of interest based on identified minimum adjustments; and causing a production characteristic of a well to be adjusted based on the location of the saturated subterranean formation.

Example 18: the non-transitory computer-readable medium of example 17, wherein the operations for adjusting the second time-dependent formation data set comprise operations for: initializing adjustment parameters; and modifying the second time-dependent formation data set by one or more of rotating, rescaling, tilting, or translating the second time-dependent formation data set according to the first time-dependent formation data set and the adjustment parameters.

Example 19: the non-transitory computer-readable medium of example 18, wherein the operations further comprise: calculating an impedance difference between the modified second time-dependent formation data and the first time-dependent formation data set; determining, based on the impedance difference, whether a local minimum impedance is reached; and modifying the adjustment parameters in response to determining that a local minimum impedance has not been reached.

Example 20: the non-transitory computer-readable medium of any of examples 17-19, wherein the operations for identifying the number of minimum adjustments includes operations for: identifying a global minimum error; determining the minimum adjustments based on the global minimum error; modifying the adjusted second time-dependent formation data set by one or more of rotating, rescaling, tilting, or translating the second time-dependent formation data set according to the first time-dependent formation data set and the minimum adjustment parameters; converting a result of modifying the adjusted second time-dependent formation data to original dimensions; and wherein determining the location of the saturated subterranean formation of interest based on identified minimum adjustments includes determining the location based on the converted result of modifying the adjusted second time-dependent formation data.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A computing device comprising:
    a processor; and
    a non-transitory memory device comprising instructions that are executable by the computing device to cause the processor of the computing device to perform operations comprising:
        identifying similarities between processing stages of a first time-dependent formation data set processed using a first migration analysis and a second time-dependent formation data set processed using a second migration analysis;
        normalizing the first time-dependent formation data set and the second time-dependent formation data set;
        initializing adjustment parameters;
        modifying the second time-dependent formation data set by one or more of rotating, rescaling, tilting, or translating the second time-dependent formation data set according to the first time-dependent formation data set and the adjustment parameters;
        calculating an impedance difference between the modified second time-dependent formation data set and the first time-dependent formation data set;
        determining, based on the impedance difference, whether a local minimum impedance is reached;
        modifying the adjustment parameters in response to determining that the local minimum impedance has not been reached;
        adjusting the second time-dependent formation data set to align the second time-dependent formation data set with the first time-dependent formation data set according to identified zones to cause the second time-dependent formation data set to match the first time-dependent formation data set in the identified zones;
        identifying a number of minimum adjustments from adjusting the second time-dependent formation data set and the first time-dependent formation data set;
        determining a location of a saturated subterranean formation based on identified minimum adjustments; and
        causing an operating characteristic of a well tool to be adjusted based on the location of the saturated subterranean formation, wherein causing the operating characteristic of the well tool to be adjusted based on the location of the saturated subterranean formation includes adjusting a trajectory of the well tool as part of a well planning phase.

2. The computing device of claim 1, wherein the first migration analysis is derived from post stack time or depth migration and the second migration analysis is derived from post stack migration of an alternate processing methodology.

3. The computing device of claim 1, wherein normalizing the first time-dependent formation data set and the second time-dependent formation data set comprises executing a function on the first time-dependent formation data set and the second time-dependent formation data set to remove dimension components.

4. The computing device of claim 1, wherein the adjustment parameters are one or more of a shift distance, a rotation vector, angle of tilt, scaling factor or a rotation angle.

5. The computing device of claim 1, wherein identifying the number of minimum adjustments comprises:
identifying a global minimum error;
determining the minimum adjustments based on the global minimum error;
modifying the adjusted second time-dependent formation data set by one or more of rotating, rescaling, tilting, or translating the second time-dependent formation data set according to the first time-dependent formation data set and the minimum adjustments;
converting a result of modifying the adjusted second time-dependent formation data to original dimensions; and
wherein determining the location of the saturated subterranean formation based on identified minimum adjustments includes determining the location based on the converted result of modifying the adjusted second time-dependent formation data.

6. The computing device of claim 1, wherein causing the operating characteristic of the well tool to be adjusted includes modifying a production plan to increase productivity.

7. A computer-implemented method comprising:
identifying similarities between processing stages of a first time-dependent formation data set processed using a first migration analysis and a second time-dependent formation data set processed using a second migration analysis;
normalizing the first time-dependent formation data set and the second time-dependent formation data set;
initializing adjustment parameters;
modifying the second time-dependent formation data set by one or more of rotating, rescaling, tilting, or translating the second time-dependent formation data set according to the first time-dependent formation data set and the adjustment parameters;
calculating an impedance difference between a modified second time-dependent formation data and the first time-dependent formation data set;
determining, based on the impedance difference, whether a local minimum impedance is reached;
modifying the adjustment parameters in response to determining that the local minimum impedance has not been reached;
adjusting the second time-dependent formation data set to align the second time-dependent formation data set with the first time-dependent formation data set according to identified zones to cause the second time-dependent formation data set to match the first time-dependent formation data set in the identified zones;
identifying a number of minimum adjustments from adjusting the second time-dependent formation data set and the first time-dependent formation data set;
determining a location of a saturated subterranean formation based on identified minimum adjustments; and
causing an operating characteristic of a well tool to be adjusted based on the location of the saturated subterranean formation, wherein causing the operating characteristic of the well tool to be adjusted based on the location of the saturated subterranean formation includes adjusting a trajectory of the well tool as part of a well planning phase.

8. The computer-implemented method of claim 7, wherein the first migration analysis is derived from post stack time or depth migration and the second migration analysis is derived from post stack migration of an alternate processing methodology.

9. The computer-implemented method of claim 7, wherein normalizing the first time-dependent formation data set and the second time-dependent formation data set comprises executing a function on the first time-dependent formation data set and the second time-dependent formation data set to remove dimension components.

10. The computer-implemented method of claim 7, wherein the adjustment parameters are one or more of a shift distance, a rotation vector, angle of tilt, scaling factor or a rotation angle.

11. The computer-implemented method of claim 7, wherein identifying the number of minimum adjustments comprises:
identifying a global minimum error;
determining the minimum adjustments based on the global minimum error;
modifying the adjusted second time-dependent formation data set by one or more of rotating, rescaling, tilting, or translating the second time-dependent formation data set according to the first time-dependent formation data set and the minimum adjustment parameters;
converting a result of modifying the adjusted second time-dependent formation data to original dimensions; and
wherein determining the location of the saturated subterranean formation based on identified minimum adjustments includes determining the location based on the converted result of modifying the adjusted second time-dependent formation data.

12. The computer-implemented method of claim 7, wherein causing the operating characteristic of the well tool to be adjusted includes modifying a production plan to increase productivity.

13. A non-transitory computer-readable medium that includes instructions that are executable by a processing device for causing the processing device to perform operations comprising:
identifying similarities between processing stages of a first time-dependent formation data set processed using a first migration analysis and a second time-dependent formation data set processed using a second migration analysis;
normalizing the first time-dependent formation data set and the second time-dependent formation data set;
initializing adjustment parameters;
modifying the second time-dependent formation data set by one or more of rotating, rescaling, tilting, or translating the second time-dependent formation data set according to the first time-dependent formation data set and the adjustment parameters;
calculating an impedance difference between a modified second time-dependent formation data and the first time-dependent formation data set;
determining, based on the impedance difference, whether a local minimum impedance is reached;
modifying the adjustment parameters in response to determining that the local minimum impedance has not been reached;

adjusting the second time-dependent formation data set to align the second time-dependent formation data set with the first time-dependent formation data set according to identified zones to cause the second time-dependent formation data set to match the first time-dependent formation data set in the identified zones;

identifying a number of minimum adjustments from adjusting the second time-dependent formation data set and the first time-dependent formation data set;

determining a location of a saturated subterranean formation based on identified minimum adjustments; and causing an operating characteristic of a well tool to be adjusted based on the location of the saturated subterranean formation, wherein causing the operating characteristic of the well tool to be adjusted based on the location of the saturated subterranean formation includes adjusting a trajectory of the well tool as part of a well planning phase.

14. The non-transitory computer-readable medium of claim 13, wherein the operations for identifying the number of minimum adjustments includes operations for:

identifying a global minimum error;

determining the minimum adjustments based on the global minimum error;

modifying the adjusted second time-dependent formation data set by one or more of rotating, rescaling, tilting, or translating the second time-dependent formation data set according to the first time-dependent formation data set and the minimum adjustment parameters;

converting a result of modifying the adjusted second time-dependent formation data to original dimensions; and wherein determining the location of the saturated subterranean formation based on identified minimum adjustments includes determining the location based on the converted result of modifying the adjusted second time-dependent formation data.

15. The computing device of claim 1, wherein the first time-dependent formation data set and the second time-dependent formation data set include a plurality of time-lapsed images of a measured subterranean formation.

16. The computer-implemented method of claim 7, wherein the first time-dependent formation data set and the second time-dependent formation data set include a plurality of time-lapsed images of a measured subterranean formation.

17. The non-transitory computer-readable medium of claim 13, wherein the first time-dependent formation data set and the second time-dependent formation data set include a plurality of time-lapsed images of a measured subterranean formation.

18. The computing device of claim 5, wherein global minimum error is a sum of squared errors.

19. The computer-implemented method of claim 11, wherein global minimum error is a sum of squared errors.

20. The non-transitory computer-readable medium of claim 14, wherein global minimum error is a sum of squared errors.

* * * * *